United States Patent
Litchy et al.

(10) Patent No.: US 10,001,306 B2
(45) Date of Patent: Jun. 19, 2018

(54) ICE-MAKING FREEZER CLEANING

(71) Applicant: Scotsman Industries, Inc., Vernon Hills, IL (US)

(72) Inventors: William A. Litchy, Grayslake, IL (US); Keith H. Roth, Crystal Lake, IL (US); Michael J. Andresen, Lake Villa, IL (US)

(73) Assignee: Scottsman Group LLC, Vernon Hills, IL (US)

( * ) Notice: Subject to any disclaimer, the term of this patent is extended or adjusted under 35 U.S.C. 154(b) by 16 days.

(21) Appl. No.: 14/878,398

(22) Filed: Oct. 8, 2015

(65) Prior Publication Data

US 2016/0102900 A1    Apr. 14, 2016

Related U.S. Application Data

(60) Provisional application No. 62/061,901, filed on Oct. 9, 2014.

(51) Int. Cl.

| F24F 3/16 | (2006.01) |
|---|---|
| A23L 3/36 | (2006.01) |
| F25C 1/00 | (2006.01) |
| F25C 1/22 | (2006.01) |
| F25B 47/00 | (2006.01) |
| F25C 1/14 | (2018.01) |
| A23G 9/30 | (2006.01) |

(52) U.S. Cl.
CPC ............... *F25B 47/00* (2013.01); *A23G 9/30* (2013.01); *F25C 1/14* (2013.01); *F25C 1/147* (2013.01); *F25C 2400/12* (2013.01)

(58) Field of Classification Search
CPC ... F25B 47/00; A23G 9/30; F25C 1/14; F25C 1/147; F25C 2400/12; F25D 2400/22; F25D 62/303
USPC .............................................. 62/78
See application file for complete search history.

(56) References Cited

U.S. PATENT DOCUMENTS

| 548,498 | A | * | 10/1895 | Andren | ................. | A47B 39/00 |
|---|---|---|---|---|---|---|
| | | | | | | 248/411 |
| 3,369,376 | A | | 2/1968 | Kious | | |
| 3,377,815 | A | * | 4/1968 | Soderberg | ................. | A23G 9/16 |
| | | | | | | 62/137 |
| 3,638,448 | A | * | 2/1972 | Raymer | .................. | F25C 1/00 |
| | | | | | | 222/149 |

(Continued)

FOREIGN PATENT DOCUMENTS

| JP | 3699169 B2 | 9/2005 |
|---|---|---|
| JP | 2006038261 A | 2/2006 |

OTHER PUBLICATIONS

International Search Report dated Mar. 11, 2016 for PCT International Application No. PCT/US2015/000129.

(Continued)

*Primary Examiner* — Joseph Trpisovsky
(74) *Attorney, Agent, or Firm* — Schiff Hardin LLP

(57) ABSTRACT

An ice-making freezer having a freezer assembly; a fluid reservoir coupled to the freezer assembly by a hose and configured to contain a fluid; and a mounting assembly configured to adjust the fluid reservoir to be in a first position during an ice-making mode and in a second position during a cleaning mode, wherein when the fluid reservoir is in the second position the fluid submerges at least a portion of the freezer assembly.

13 Claims, 6 Drawing Sheets fluid reservoir 122 position in cleaning mode

(56) References Cited

U.S. PATENT DOCUMENTS

| | | | |
|---|---|---|---|
| 4,058,383 A | | 11/1977 | Peterson |
| 4,644,757 A | | 2/1987 | Hida et al. |
| 5,410,888 A | * | 5/1995 | Kaiser .................... A23G 9/20 |
| | | | 251/30.01 |
| 5,746,152 A | * | 5/1998 | Huse ...................... B63B 29/06 |
| | | | 114/363 |
| 6,237,350 B1 | * | 5/2001 | Hertel .................. A47F 3/0456 |
| | | | 62/264 |
| 6,499,495 B2 | * | 12/2002 | Jeng ..................... A61L 2/0088 |
| | | | 134/169 R |
| 6,857,284 B1 | * | 2/2005 | Brooks .................. F25C 1/147 |
| | | | 62/303 |
| 2005/0039984 A1 | * | 2/2005 | Nickel ...................... E04G 1/20 |
| | | | 182/141 |
| 2006/0277937 A1 | | 12/2006 | Schlosser et al. |
| 2013/0174875 A1 | * | 7/2013 | Walker .................. B08B 9/027 |
| | | | 134/22.11 |

OTHER PUBLICATIONS

Office Action dated Nov. 6, 2017 for European Patent Application No. 15848589.6.
Office Action dated Mar. 29, 2018 for Korean Application No. 10-2017-7009303 (with English translation).
Korean Registrered Utility Model No. 20-0243510 Registered Sep. 13, 2001.

* cited by examiner

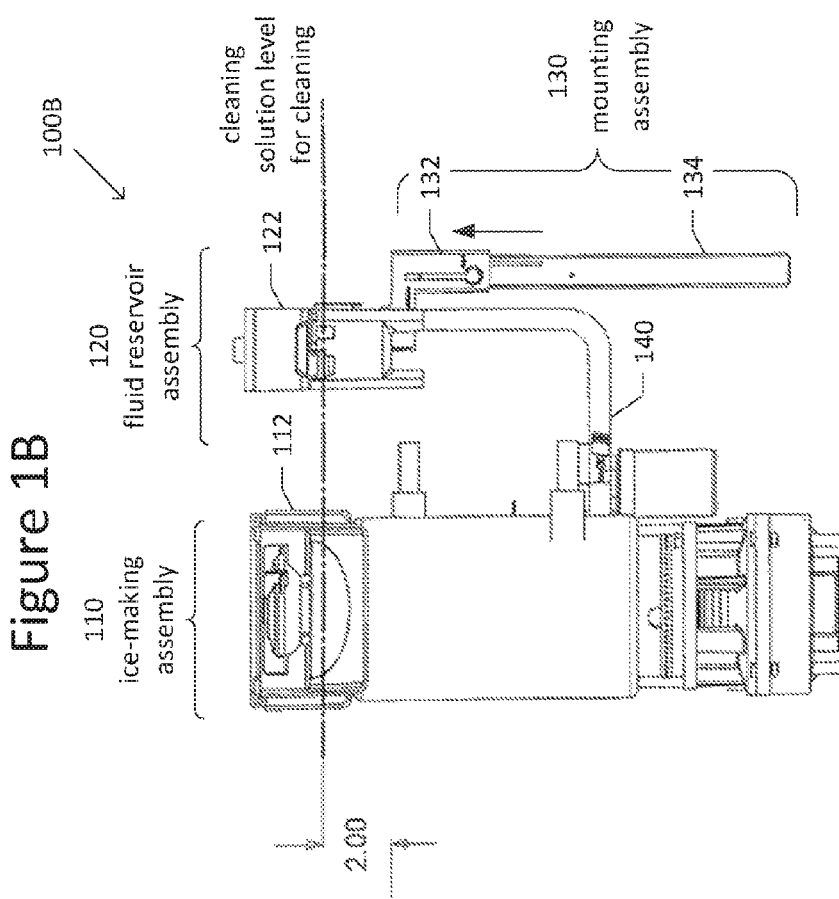
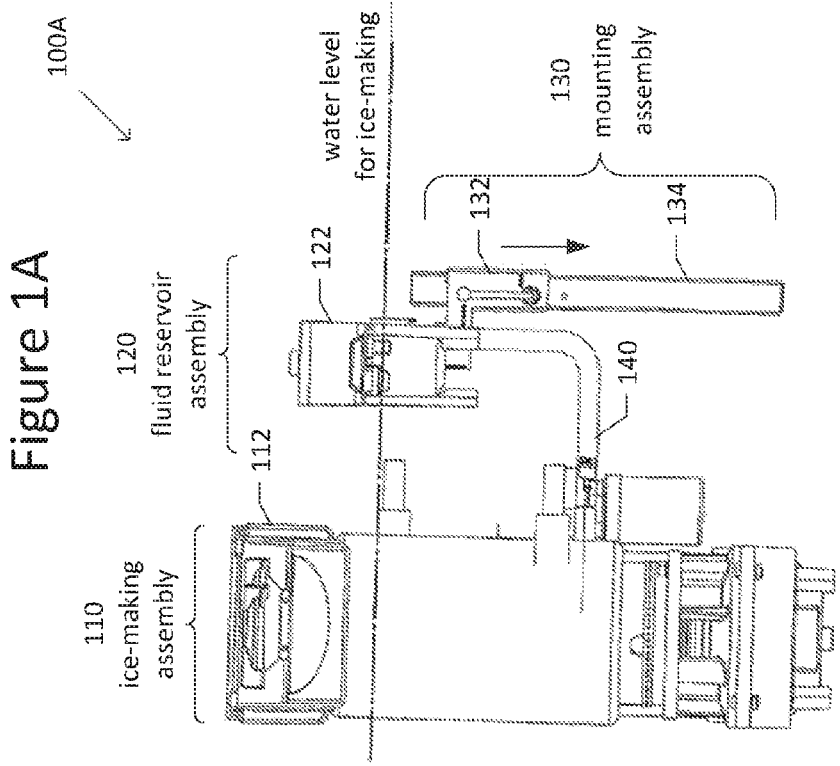

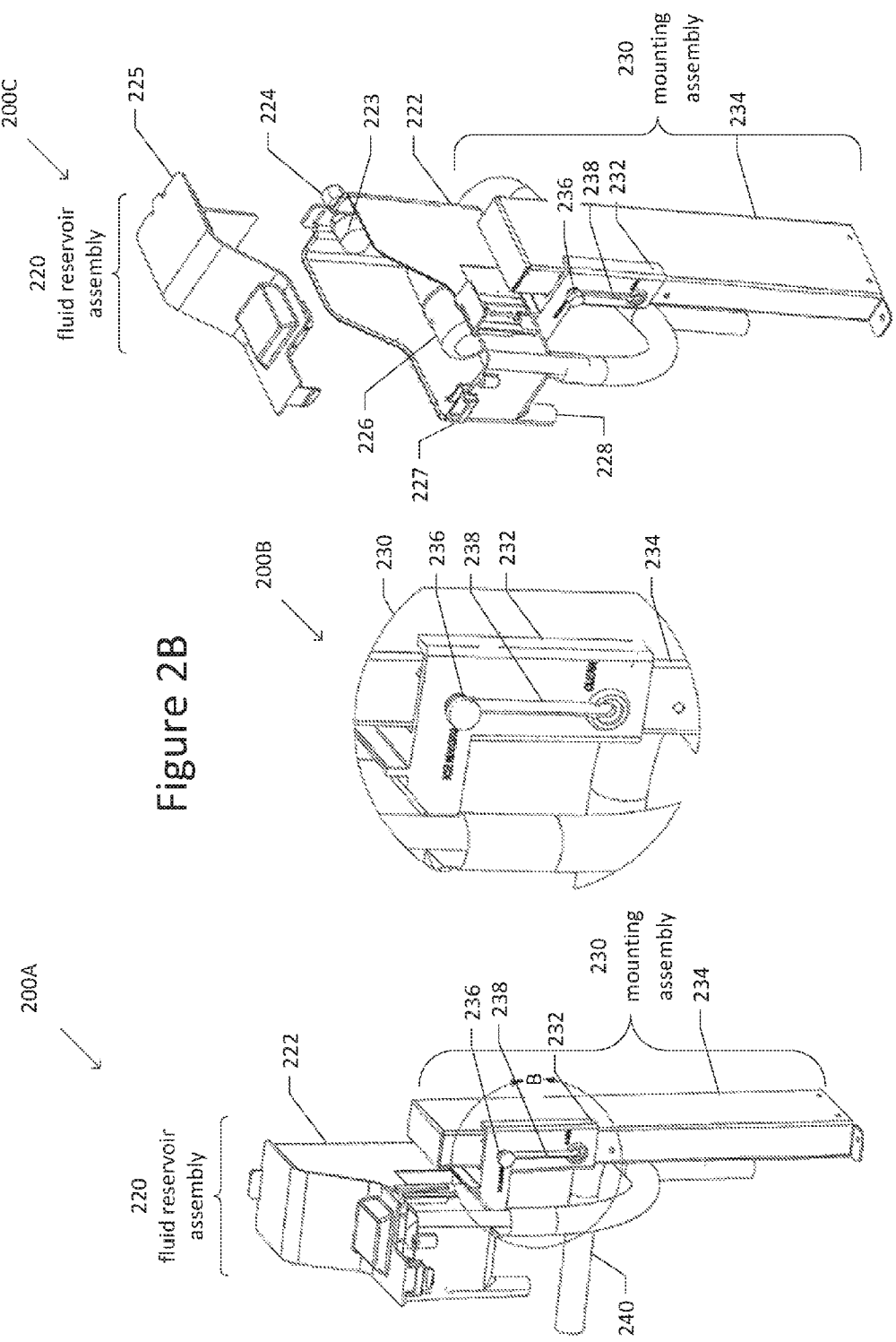

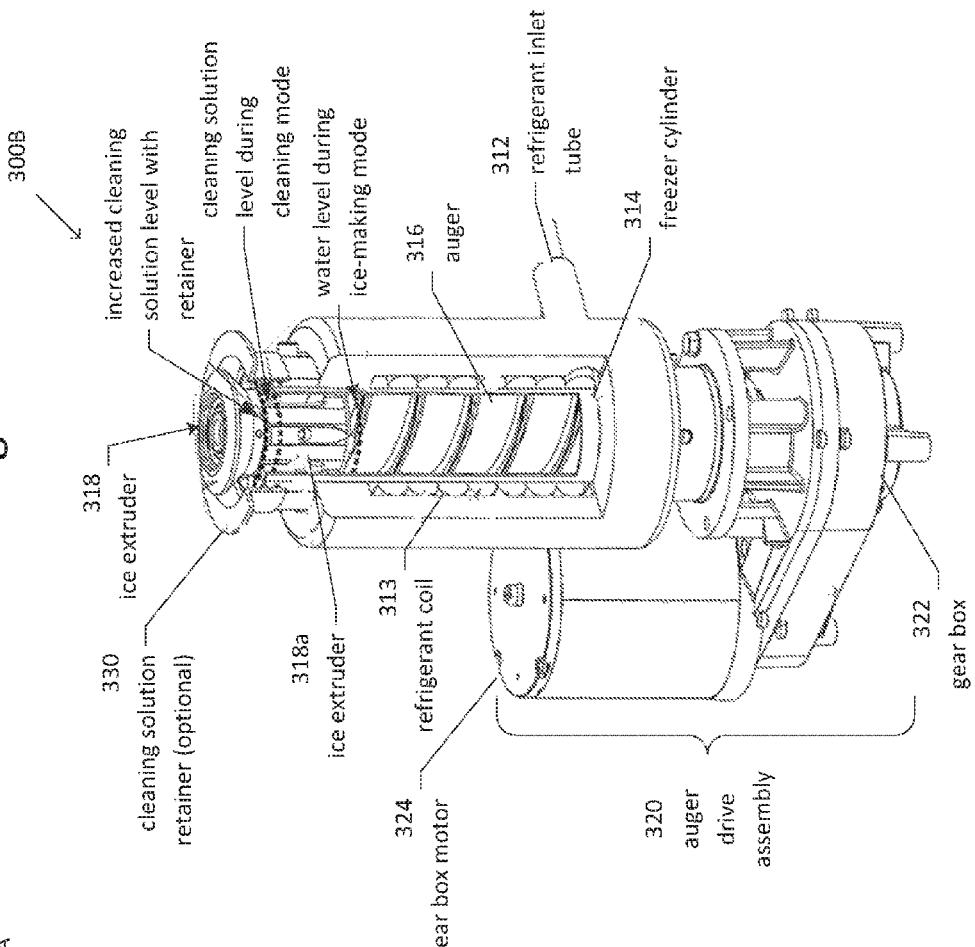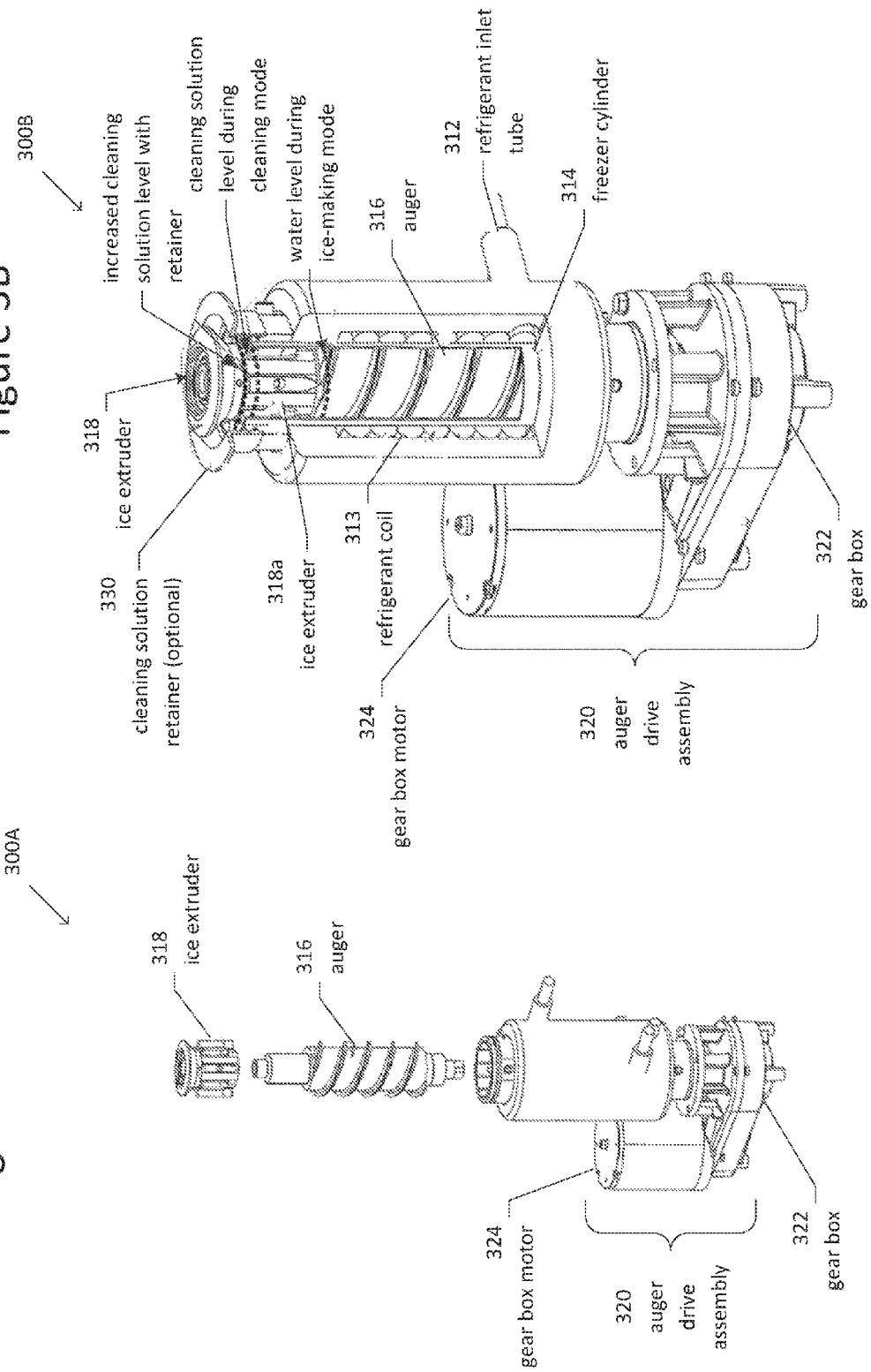

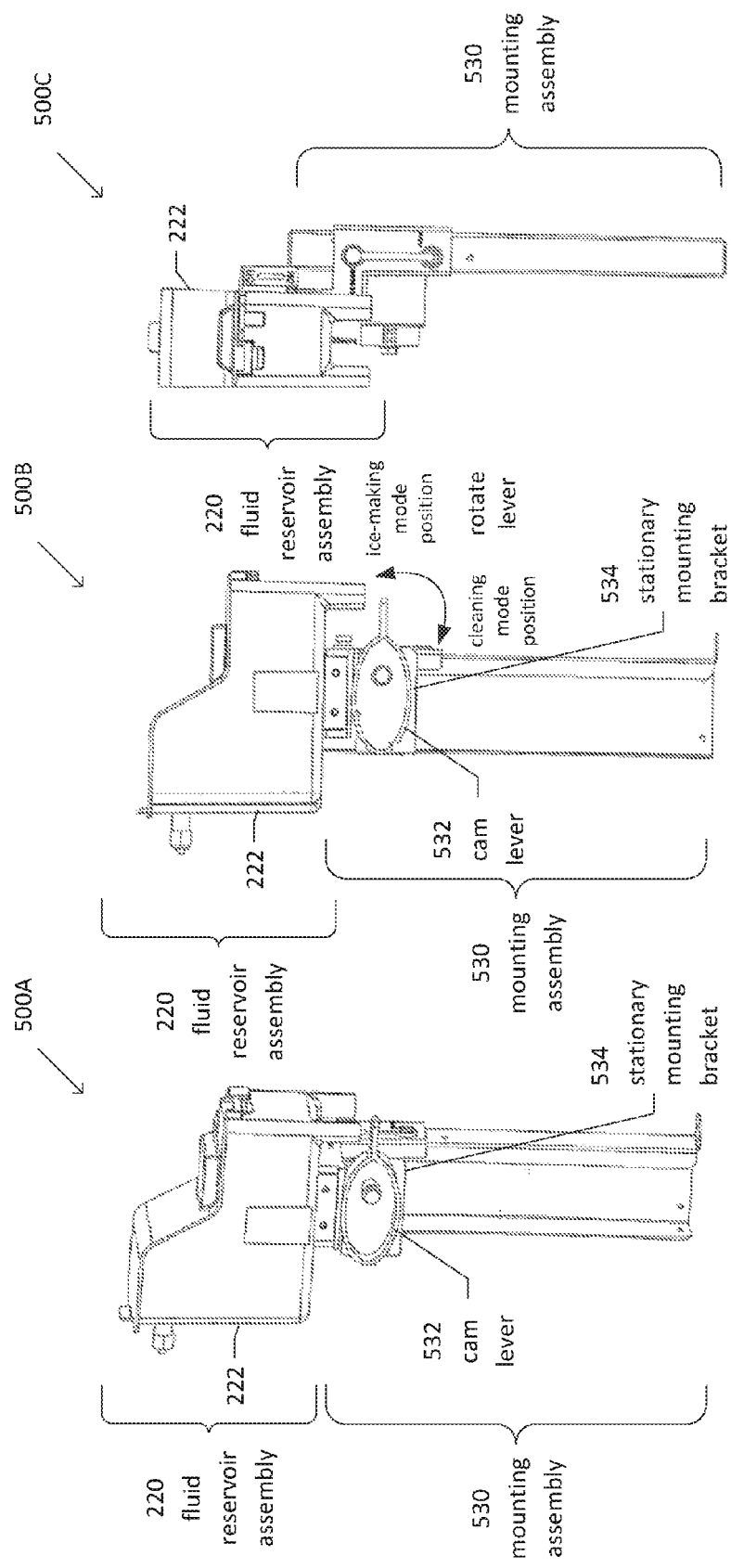

ICE-MAKING FREEZER CLEANING

TECHNICAL FIELD

The present disclosure relates to an ice-making freezer, and more specifically, to the cleaning of an ice-making freezer.

BACKGROUND

Manufacturers generally recommend that ice-making freezers be cleaned every six months, and sometimes more frequently when supply water to the freezer has a high level of dissolved minerals. Mineral buildup on the freezer, auger, and ice extruder parts can lead to increased loading and early life failure of the ice-making freezer bearings and gearbox.

Each manufacturer has developed a cleaning process tailored to their equipment requirements based on the design and materials used to construct the ice-making freezer. The cleaning solution used to remove mineral buildup is generally a mixture of citric and phosphoric acids and warm water. Some of the cleaning processes can take as long as four hours, depending on the amount of mineral buildup. Also, each of the current cleaning methods requires disassembly of freezer components, which may expose a technician to potentially harmful cleaning solutions.

BRIEF DESCRIPTION OF THE DRAWINGS

FIGS. 1A and 1B illustrate schematic diagrams of a general view of an ice-making freezer in accordance with this disclosure.

FIGS. 2A, 2B, and 2C illustrate schematic diagrams of a fluid reservoir assembly.

FIGS. 3A and 3B illustrate schematic diagrams of a freezer assembly in accordance with this disclosure.

FIGS. 5A, 5B, and 5C illustrate schematic diagrams of an alternative mounting assembly in accordance with this disclosure.

DETAILED DESCRIPTION

Figure 4B:
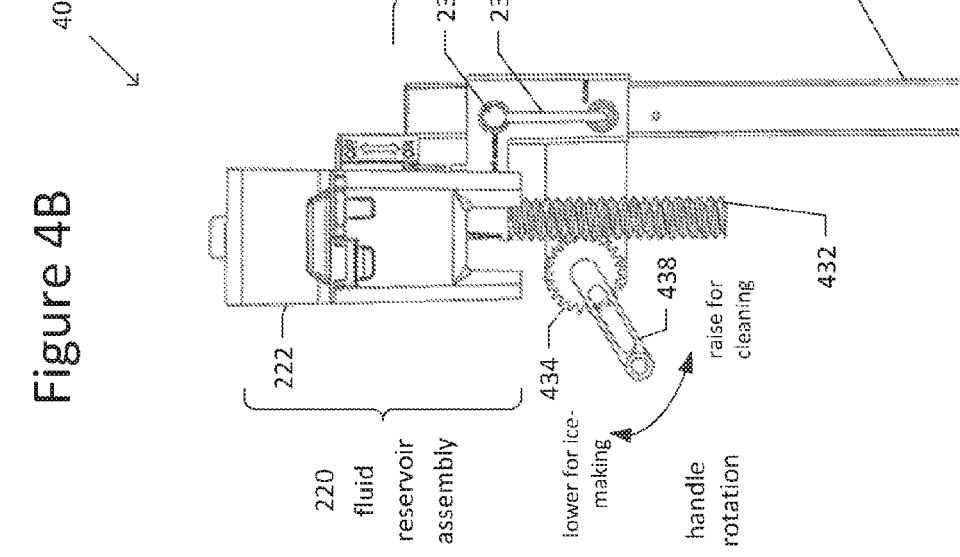
FIGS. 4A and 4B illustrate schematic diagrams of an alternative mounting assembly in accordance with this disclosure.

The present disclosure is directed to an ice-making freezer, having a freezer assembly; a fluid reservoir coupled to the freezer assembly by a hose and configured to contain a fluid; and a mounting assembly configured to adjust the fluid reservoir to be in a first position during an ice-making mode and in a second position during a cleaning mode, wherein when the fluid reservoir is in the second position the fluid submerges at least a portion of the freezer assembly.

The ice-making freezer of this disclosure has a simplified and less time-consuming cleaning process without a reduction in thoroughness of the cleaning. There is no need to disassemble freezer parts. Also, the handling of corrosive cleaning solutions is minimized. Cleaning is more likely to be performed routinely, thereby extending the ice-making freezer's operational life.

FIGS. 1A and 1B illustrate schematic diagrams of a general view of an ice-making freezer 100 in accordance with this disclosure. These figures illustrate a fluid level difference in a fluid reservoir position during an ice-making mode (FIG. 1A) and during a cleaning mode (FIG. 1B).

The ice-making freezer 100 comprises an ice-making assembly 110, a fluid reservoir assembly 120, a mounting assembly 130, and a tube 140. The ice-making assembly 110 and the fluid reservoir assembly 120 are connected by a tube 140. The ice-making assembly 110 has a freezer assembly 112. The fluid reservoir assembly 120 has a fluid reservoir 122, which is held in place by the mounting assembly 130. The mounting assembly 130 has a reservoir position bracket 132 adjustably mounted on a reservoir mounting post 134.

FIG. 1A illustrates the ice-making freezer 100A having the fluid reservoir 122 in an ice-making mode position. The fluid reservoir 122 is held in place on the reservoir mounting post 134 by the fluid reservoir position bracket 132. During this ice-making mode the fluid is water. The water level for ice-making is indicated by the horizontal, dashed line, and as can be seen, is below the freezer assembly.

FIG. 1B illustrates the ice-making freezer 100B having the fluid reservoir 122 in a cleaning mode position. The fluid reservoir 122 is again held in place on the reservoir mounting post 134 by the reservoir position bracket 132. During this mode the fluid is a cleaning solution. The cleaning solution level for cleaning is indicated by the horizontal, dashed line. As can be seen, in the cleaning mode position the cleaning solution level is higher than the water level during the ice-making mode such that the cleaning solution submerges at least a portion of the components of the freezer assembly 112.

FIGS. 2A, 2B, and 2C illustrate schematic diagrams of the fluid reservoir and mounting assemblies 200. FIG. 2A illustrates a general view of the fluid reservoir and mounting assemblies 200A. FIG. 2B illustrates a schematic diagram of a close-up of a mounting assembly 230 of FIG. 2A. FIG. 2C illustrates a schematic diagram of a fluid reservoir and mounting assemblies 200C with a reservoir cover 225 removed. The fluid reservoir assembly 220 is similar to the fluid reservoir assembly 120 of FIGS. 1A and 1B.

An inlet connection 224 allows water to enter the fluid reservoir 222 though valve 223. A float 226 located in the fluid reservoir 222 maintains a fluid level in the fluid reservoir 222. If the fluid level becomes too high, the excess fluid flows through a reservoir overflow 227 and exists through an overflow drain port 228.

Because the ice-making assembly 110 (shown in FIGS. 1A and 1B) and the fluid reservoir 222 are connected by a tube 230, the ice-making assembly 110 and the fluid reservoir 222 maintain a same level of water. During the ice-making mode the fluid reservoir assembly, and thus the fluid reservoir 222, is placed in its lowest position along the reservoir mounting post 234, and the water level is typically about 2.0" below the top of the freezer assembly 112 (shown in FIGS. 1A and 1B).

To start the cleaning mode, the fluid reservoir assembly 220 is raised by loosening a screw 236 which fastens the reservoir position bracket 232 to the reservoir mounting post 234. The reservoir position bracket 232 is then slid to a higher, typically maximum, height along the reservoir mounting post 234. The reservoir position bracket 232 is secured in place on the reservoir mounting post 234 by the screw 236 and a bracket 238 placed in a "clean" hole.

Any water is then drained from the fluid reservoir 222, and the cleaning solution is poured into the fluid reservoir 222 until the cleaning solution level reaches the reservoir overflow 227. At that level the cleaning solution is at the top of the freezer assembly 112 and submerges at least a portion, and preferably all, of the freezer assembly components. Manual positioning of the fluid reservoir 222 is one positioning method that is simple and effective. There are alternative means for positioning the fluid reservoir 222, as discussed further below with respect to FIGS. 4A-4B and 5A-5C.

FIGS. 3A and 3B illustrate schematic diagrams of a freezer assembly 300 in accordance with this disclosure. FIG. 3B illustrates a section view of the freezer assembly 300B showing water levels during the ice-making and cleaning modes.

The freezer assembly 300 and a condensing unit (not shown) operate together to produce and harvest ice. In a continuous-mode freezer assembly 300, ice is made and harvested simultaneously. Continuous-mode ice-making freezers that make flaked or nugget ice forms are commonly known as flaker ice-making freezers.

The freezer assembly 300 of a flaker ice-making freezer generally comprises a freezer cylinder 314 that has an external surface surrounded by a refrigerant coil 313 through which a refrigerant flows. The refrigerant is circulated by operation of a compressor (not shown). As the freezer cylinder 314 is being chilled, water is applied to its internal surface so that ice forms thereon. A layer of the ice is removed and conveyed to a top of the freezer cylinder 314 by an auger 316. The ice is then pushed through the passages 318a of an ice extruder 318, which define the ice form, and the ice is dispensed to an ice bin (not shown). The auger drive assembly 320 driving the auger 316 comprises a gear box motor 324 and a gear box 322.

A cleaning solution retainer 330 is optionally installed at the top of the freezer assembly. The cleaning solution retainer 330 keeps the cleaning solution from spilling into the ice in a case where the freezer assembly 300 over filled. During the cleaning process the ice chute (not shown) would be replaced with the cleaning solution retainer 330 before adding cleaning solution into the fluid reservoir assembly 120, 220.

FIG. 3B illustrates various fluid levels. More specifically, FIG. 3B illustrates the water level during the ice-making mode, a cleaning solution level during the cleaning mode without the cleaning solution retainer 330, and the cleaning solution level during the cleaning mode with the cleaning solution retainer 330.

Figure 4A:
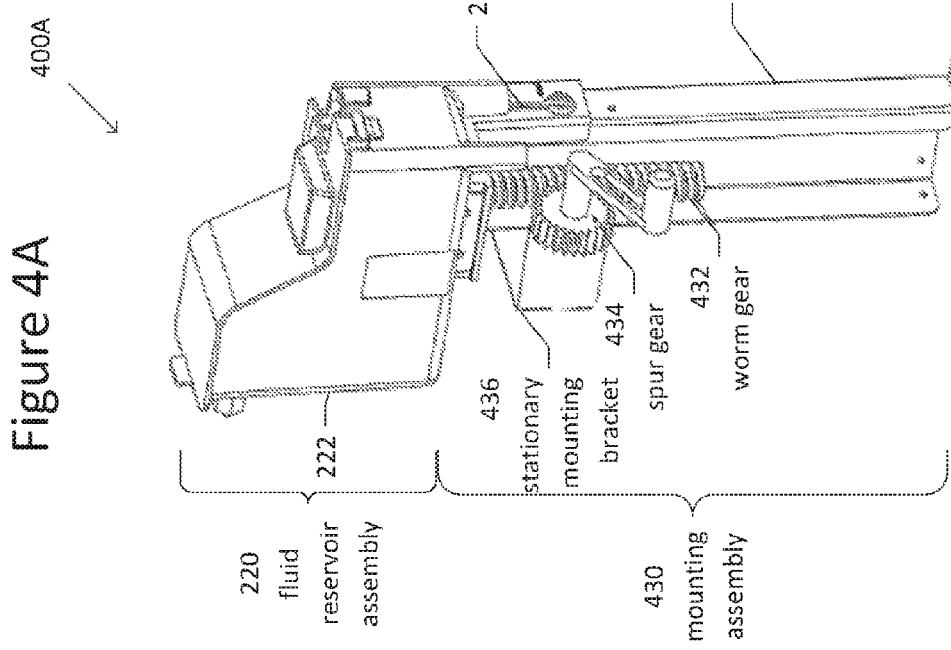

FIGS. 4A and 4B illustrate schematic diagrams of an alternative mounting assembly 430 in accordance with this disclosure.

The mounting assembly 430 comprises a worm gear 432, a spur gear 434, a stationary bracket 436, and a handle 438. When a technician rotates the handle 438, the spur gear 434 rotates and meshes with the worm gear 432 to cause the worm gear 432, stationary bracket 436, and fluid reservoir 222 to move vertically up or down, depending on whether the handle 438 is rotated clockwise or counter-clockwise. Again, the fluid reservoir 222 is moved to a higher position for a cleaning mode, and to a lower position for an ice-making mode.

FIGS. 5A, 5B, and 5C illustrate schematic diagrams of an alternative mounting assembly in accordance with this disclosure.

The mounting assembly 530 comprises a cam lever 532 and a stationary mounting bracket 534. The cam lever surface is in contact with the fluid reservoir 222. The elliptical shape of the cam lever 532 when rotated (in this example 90° causes the stationary mounting bracket 534 and the fluid reservoir 222 to move vertically up or down. Rotating the cam lever in a downward direction causes the stationary mounting bracket 534 and the fluid reservoir 222 to be raised up into a cleaning mode position. Conversely, rotating the cam level in an upward direction causes the fluid reservoir 222 to be lowered down into an ice-making mode position. It is understood that the disclosure is not limited to this exact cam lever design, but that suitable modifications, such as to the shape of the cam lever 532, are contemplated to be within the scope of this disclosure.

Other mechanical means could be used to achieve the dual positions of the mounting assembly and fluid reservoir. For example, a threaded rod and lever, which when rotated, raises or lowers the fluid reservoir. Alternatively, an automated electromechanical device, such as a motor and gear reducer or solenoid, may position the mounting assembly and fluid reservoir. This electromechanical device may be controlled by an independent cleaning switch or as part of an ice-making control system.

Figure 6:
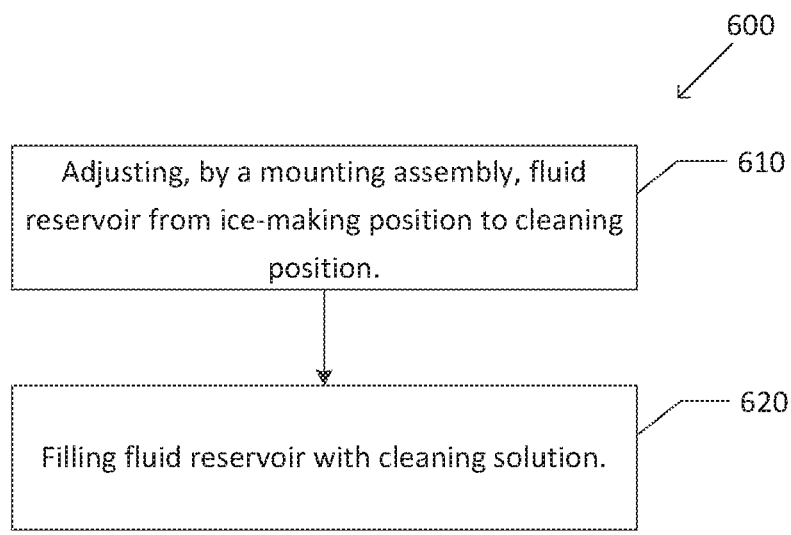
FIG. 6 illustrates a flowchart of a method of cleaning an ice-making freezer in accordance with this disclosure.

FIG. 6 illustrates a flowchart 600 of a general method of cleaning an ice-making freezer in accordance with this disclosure. As discussed above, the ice-making freezer has a fluid reservoir 122, 222 for containing a fluid and is coupled to a freezer assembly 112, 212 by a hose 140, 240.

Before starting the cleaning process, a technician turns off the ice-making freezer to cease any ice-making operations and shuts off the water supply. Water is then drained from the ice-making freezer.

In Step 610, the fluid reservoir 122, 222 is adjusted from an ice-making position to a cleaning position by a mounting assembly 130, 230, 430, 530. This adjustment may be in accordance with any of the means and methods as disclosed herein.

In Step 620, the reservoir cover 225 is removed from the fluid reservoir 122, 222, and the technician pours a cleaning solution into the fluid reservoir 122, 222 until full. When the fluid reservoir 122, 222 is in the cleaning mode position, the cleaning solution submerges at least a portion, and preferably all, of the freezer assembly components.

The technician then operates the ice-making freezer for a predetermined period of time, such as 30 minutes. The cleaning solution is then drained from the ice-making freezer, and the fluid reservoir 122, 222 is lower back to the ice-making mode position. The ice formed initially after cleaning should be discarded, and then a normal ice-making operation may be resumed.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. An ice-making freezer, comprising:
   a freezer assembly;
   a fluid reservoir coupled to the freezer assembly by a hose and configured to contain a fluid; and
   a mounting assembly configured to adjust the fluid reservoir to be in a first position during an ice-making mode and in a second position during a cleaning mode, wherein the freezer assembly and the fluid reservoir maintain substantially a same vertical level of fluid as one another when the mounting assembly is in the first position and when the mounting assembly is in the second position, and when the fluid reservoir is in the second position the fluid submerges at least a portion of the freezer assembly.

2. The ice-making freezer of claim 1, wherein the freezer assembly comprises:
a freezer cylinder configured to form ice;
an ice extruder configured to shape the formed ice; and
an auger configured drive the formed ice through the ice extruder.

3. The ice-making freezer of claim 1, wherein during the cleaning mode the fluid is a cleaning solution.

4. The ice-making freezer of claim 1, wherein during the ice-making mode the fluid is water.

5. The ice-making freezer of claim 1, wherein the mounting assembly comprises:
a fluid reservoir mounting post;
a fluid reservoir position bracket adjustably mounted on the fluid reservoir mounting post; and
a screw configured to secure the fluid reservoir position bracket on the fluid reservoir mounting post.

6. The ice-making freezer of claim 1, wherein the mounting assembly comprises:
a fluid reservoir mounting bracket;
a spur gear attached to the fluid reservoir mounting bracket;
a worm gear meshed with the spur gear;
a rotatable handle attached to the spur gear and configured to cause the spur gear and the fluid reservoir mounting bracket to move vertically along the worm gear.

7. The ice-making freezer of claim 1, wherein the mounting assembly comprises:
a stationary mounting bracket; and
an elliptical cam lever attached to the stationary mounting bracket and positioned in contact with the fluid reservoir,
wherein a rotation of the elliptical cam lever is configured to move the fluid reservoir vertically.

8. The ice-making freezer of claim 1, wherein the mounting assembly is an electromechanical device.

9. The ice-making freezer of claim 1, further comprising a cleaning fluid retainer located at a top portion of the freezer assembly and configured to prevent fluid from spilling out of the freezer assembly.

10. The ice-making freezer of claim 1, wherein the ice-making freezer is a continuous ice-making freezer.

11. An ice-making freezer, comprising:
a freezer assembly;
a fluid reservoir coupled to the freezer assembly by a hose and configured to contain a fluid; and
a mounting assembly means for adjusting the fluid reservoir to be in a first position during an ice-making mode and in a second position during a cleaning mode,
wherein the freezer assembly and the fluid reservoir maintain substantially a same vertical level of fluid as one another when the mounting assembly means is in the first position and when the mounting assembly means is in the second position, and when the fluid reservoir is in the second position the fluid submerges at least a portion of the freezer assembly.

12. The ice-making freezer of claim 1, further comprising:
a float located in the fluid reservoir and configured to maintain the fluid level in the fluid reservoir.

13. The ice-making freezer of claim 1, further comprising:
a reservoir overflow configured to allow excess fluid to flow therethrough.

* * * * *